United States Patent
Wyszynski

(10) Patent No.: US 7,486,338 B1
(45) Date of Patent: Feb. 3, 2009

(54) FULLY INTEGRATED TERRESTRIAL TV TUNER ARCHITECTURE

(76) Inventor: Adam S. Wyszynski, 1512 Highland Cir., Little Elm, TX (US) 75068-3787

( * ) Notice: Subject to any disclaimer, the term of this patent is extended or adjusted under 35 U.S.C. 154(b) by 101 days.

(21) Appl. No.: 10/423,913

(22) Filed: Apr. 28, 2003

(51) Int. Cl.
*H04N 5/44* (2006.01)
*H04N 5/50* (2006.01)

(52) U.S. Cl. .................. 348/731; 348/725; 348/733; 455/189.1; 455/296; 455/334; 455/339; 327/557; 327/564

(58) Field of Classification Search ............... 348/725, 348/731, 733; 455/189, 1, 296, 334, 339; 327/557, 564; *H04N 5/44; H04B 1/16*
See application file for complete search history.

(56) References Cited

U.S. PATENT DOCUMENTS

| | | | |
|---|---|---|---|
| 3,997,856 A | | 12/1976 | Canning et al. |
| 4,438,529 A | | 3/1984 | Sato |
| 4,952,891 A | | 8/1990 | Moulding |
| 5,072,298 A | | 12/1991 | Sumiyoshi |
| 5,210,504 A | | 5/1993 | Yagita et al. |
| 5,345,119 A | | 9/1994 | Khoury |
| 5,440,264 A | | 8/1995 | Sevenhans et al. |
| 5,471,168 A | | 11/1995 | Sevenhans et al. |
| 5,608,665 A | | 3/1997 | Wyszynski |
| 5,737,035 A | | 4/1998 | Rotzoll |
| 5,812,612 A | * | 9/1998 | Saito ................. 375/272 |
| 5,896,562 A | * | 4/1999 | Heinonen ............ 455/76 |
| 5,912,583 A | | 6/1999 | Pierson et al. |
| 5,914,663 A | | 6/1999 | Whitehad |
| 6,031,878 A | | 2/2000 | Tomasz et al. |
| 6,177,964 B1 | | 1/2001 | Birleson et al. |
| 6,285,865 B1 | | 9/2001 | Vorenkamp et al. |
| 6,356,736 B2 | | 3/2002 | Tomasz et al. |
| 6,377,315 B1 | | 4/2002 | Carr et al. |
| 6,404,277 B1 | | 6/2002 | Lee et al. |
| 6,417,727 B1 | | 7/2002 | Davis |

(Continued)

FOREIGN PATENT DOCUMENTS

DE 3226980 * 1/1984

OTHER PUBLICATIONS

Y. Tsividis, "Self-Tune Filters," Electronic Letters, vol. 17 (No. 12), p. 406-407, (Jun. 1981).

(Continued)

*Primary Examiner*—Brian P Yenke
(74) *Attorney, Agent, or Firm*—Locke Lord Bissell & Liddell, LLP

(57) ABSTRACT

A TV tuner consisting of a least one low-noise amplifier, one mixer and one variable-gain amplifier plus two band-pass filters, the first of which is placed after low-noise amplifier and before the mixer, and the second of which is placed after mixer and before variable-gain amplifier. The filters are on-chip active devices equipped with on-chip frequency- and Q-tuning systems. The first band-pass filter is a real filter, such that its frequency response is symmetrical for positive and negative frequencies. The second band-pass filter is a complex filter, such that its frequency response has transmission for positive frequencies, but blocks negative frequencies. The low-noise amplifier includes gain control. The mixer is a complex-mixer consisting of two identical mixers driven by two local oscillator signals in quadrature.

14 Claims, 4 Drawing Sheets

U.S. PATENT DOCUMENTS

| | | |
|---|---|---|
| 6,496,230 B1 | 12/2002 | Limberg et al. |
| 6,611,569 B1* | 8/2003 | Schier et al. ................. 375/322 |
| 6,714,776 B1* | 3/2004 | Birleson ..................... 455/302 |
| 6,917,252 B1* | 7/2005 | Wyszynski ................. 333/17.1 |
| 7,173,991 B2* | 2/2007 | Scarpa ....................... 375/350 |
| 2001/0006539 A1* | 7/2001 | Kim ........................... 375/321 |
| 2001/0050966 A1* | 12/2001 | Signell et al. ............... 375/350 |
| 2002/0068541 A1* | 6/2002 | Helio et al. ................. 455/340 |
| 2002/0073436 A1* | 6/2002 | Cowley et al. .............. 725/131 |
| 2003/0162521 A1* | 8/2003 | Vorenkamp et al. ......... 455/302 |
| 2006/0040630 A1* | 2/2006 | Mostov et al. ........... 455/241.1 |

OTHER PUBLICATIONS

G.A. De Veirman & R. Yamasaki, "Fully-Integrated 5 to 15 MHz Programmable Bessel Lowpass Filter," Proc. IEEE Int. Symp. Circ. Syst., p. 1155-1158, (1990).

G.A. De Veirman & R. Yamasaki, "Monolithic 10-30 MHz Tunable Bipolar Bessel Lowpass Filter," Proc. IEEE Int. Symp. Circ. Syst., p. 1444-1447, (1991).

G.A. De Veirman & R. Yamasaki, "Design of Bipolar 10-MHz Programmable Continuous Time 0.05 Equiripple Linear Phase Filter," IEEE J. Solid-State Circuits, vol. 27 (No. 3), p. 324-331, (1992).

* cited by examiner

FULLY INTEGRATED TERRESTRIAL TV TUNER ARCHITECTURE

TECHNICAL FIELD OF THE INVENTION

The present invention relates to TV receivers, or tuners such as those utilized for terrestrial (off-the-air) broadcast reception, and more particularly to a fully integrated implementation of the terrestrial TV tuner on a silicon chip.

BACKGROUND OF THE INVENTION

Currently, terrestrial tuners are built as hybrid devices using limited number of small ICs, metal shield can and external discrete components such as manually tuned coils and varactors. Significant progress has been made in integration of cable tuners. Most of these devices are integrated on one chip with two external ceramic or surface-acoustic wave (SAW) filters and a few several other discrete components.

A reason for the slow progress in integration of a terrestrial TV tuner is the extremely demanding environment of off-the-air reception. The main problem is high power, out of band interferers such as cellular phone services that are close enough to the TV band. Another source of interference is high power in-band TV signals from other TV broadcast stations that the tuner is not presently tuned to. This problem is often referred to as near-far station problem. The two remaining design challenges are the required high image rejection ratio, IRR>65 dB and the required overall low noise figure, NF<8 dB of the tuner for different gain settings.

All these requirements can be met separately. However, their simultaneous meeting poses a substantial challenge for a fully integrated receiver. The existing dual-conversion cable-tuner architectures are not suitable for the implementation of a fully integrated terrestrial tuner for three reasons. They do not include any pre-filtering at RF, and therefore for the terrestrial application the low-noise amplifier (LNA) and mixer are overloaded such that their linearity requirements are difficult to meet. Next, double conversion systems are prone to excessive power consumption while attempting to meet the stringent intermodulation specs such as CTB, CSO and X-MOD. Furthermore, near-far station problem causes the severe noise and distortion degradation. Finally, their image rejection, typically in the 50-60 dB range, is not sufficient for terrestrial application.

DESCRIPTION OF THE PRIOR ART

The architecture of classical hybrid terrestrial analog tuner 20 is presented in FIG. 1. It consists of a passive tunable preselect bandpass filter 22 followed by the low-noise amplifier (LNA) circuit 24 and a single down-conversion mixer 26. The output of the mixer 26 is connected to the input of a standard TV IF 43.75 MHz SAW filter 28, with its output connected to the variable-gain amplifier VGA 29. The main problem with this architecture is that the preselect tunable bandpass filter 22 is built as a discrete device using varactors as tunable capacitance elements and with its inductor coils manually adjusted during the manufacturing process. Discrete varactors pose an additional problem since they need a separate 15V or more supply voltage for better tuning range. Furthermore, because the input signal is out of the filter the whole structure needs to be shielded with a metal can. Otherwise, the high-frequency noise would couple and totally distort the weak input TV signal.

The architecture of typical integrated cable tuner 30 such as one described in U.S. Pat. Nos. 5,737,035 and 6,177,964 is presented in FIG. 2. It consists of an high-frequency image reject low-pass filter (not shown in FIG. 3 for simplicity) followed by the LNA circuit 31 with its output connected to the first up-conversion mixer 33 which receives an input from a local oscillator 32. The output of the mixer 33 is brought off-chip to a ceramic BPF 34 with the center frequency in the range of 1000-1200 MHz with bandwidth of about 30 MHz. Next the signal is brought back on-chip to the input of a complex down-conversion mixer 36. The output of the mixer is summed by the poly-phase filter/summer 37, which cancels the undesired image on the second mixer and passed again off-chip to a standard TV IF SAW filter 38 at 43.75 MHz. After passing the external IF filter the signal is brought back on-chip to the input of the variable gain amplifier VGA 39. There are two main problems with this architecture. First, it requires two external filters and several discrete components that complicate the board design and increase the cost of installing the tuner by approximately $2. Secondly, since there is no prefiltering the strong interferers would load the input of the LNA, in particular the first mixer, and would severely degrade its intermodulation distortion performance. Therefore, this architecture is not suitable for the terrestrial applications, but can be used in the cable environments where all signal powers are uniform. Finally, since this architecture uses double-conversion and two external filters its power consumption is high.

The architecture of typical integrated DBS tuner 40 such as one described in U.S. Pat. Nos. 6,031,878 and 6,356,736 is presented in FIG. 3. It consists of the LNA circuit 42 with its output connected to the pair of first down-conversion mixers 44 and 45. The I and Q outputs of the mixers 44 and 45 are connected to two active low-pass filters 46 and 48. Next, I and Q signals are connected to the inputs of the variable gain amplifiers VGA 47 and 49. The problem with this architecture is that since the LO is at the carrier frequency one of the mixer signal components is the dc-offset, which could severely degrade mixer's performance. This problem can be mitigated with the use of special offset cancellation schemes. They can be built as a local analog loop, or using external DSP, as mixed-mode system.

SUMMARY OF THE INVENTION

The proposed architecture introduces a tunable on-chip pre-filtering prior to a single down-conversion. This arrangement serves conserving the receiver power while simultaneously off-loading the front-end from the unwanted interferes. The image is rejected by 3 on-chip devices: the tunable RF bandpass, the complex-mixer and the complex IF bandpass filter. Overall image rejection is estimated to reach 65 dB, which is sufficient for this application. The ability to control the LNA's gain by 25-30 dB helps reduce the distortion level in case the input is overloaded. The VGA amplifier provides the remaining 50-55 dB of gain control.

BRIEF DESCRIPTION OF THE DRAWINGS

For a more complete understanding of the present invention and for further advantages thereof, reference is now made to the following Description of the Preferred Embodiments taken in conjunction with the accompanying Drawing in which.

DESCRIPTION OF THE PREFERRED EMBODIMENTS

Figure 1:
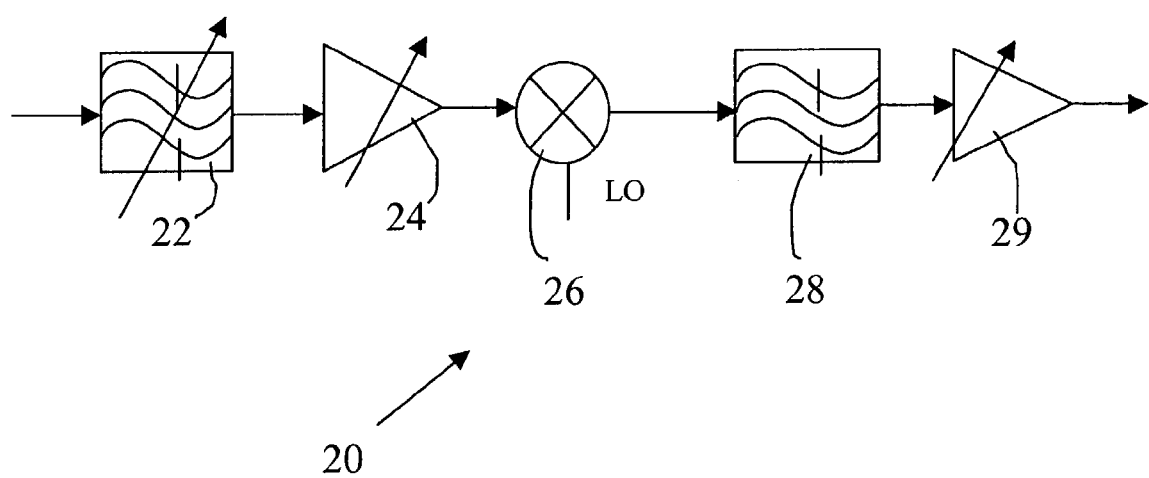
FIG. 1 is a block diagram of a prior art hybrid terrestrial analog tuner.
Figure 2:
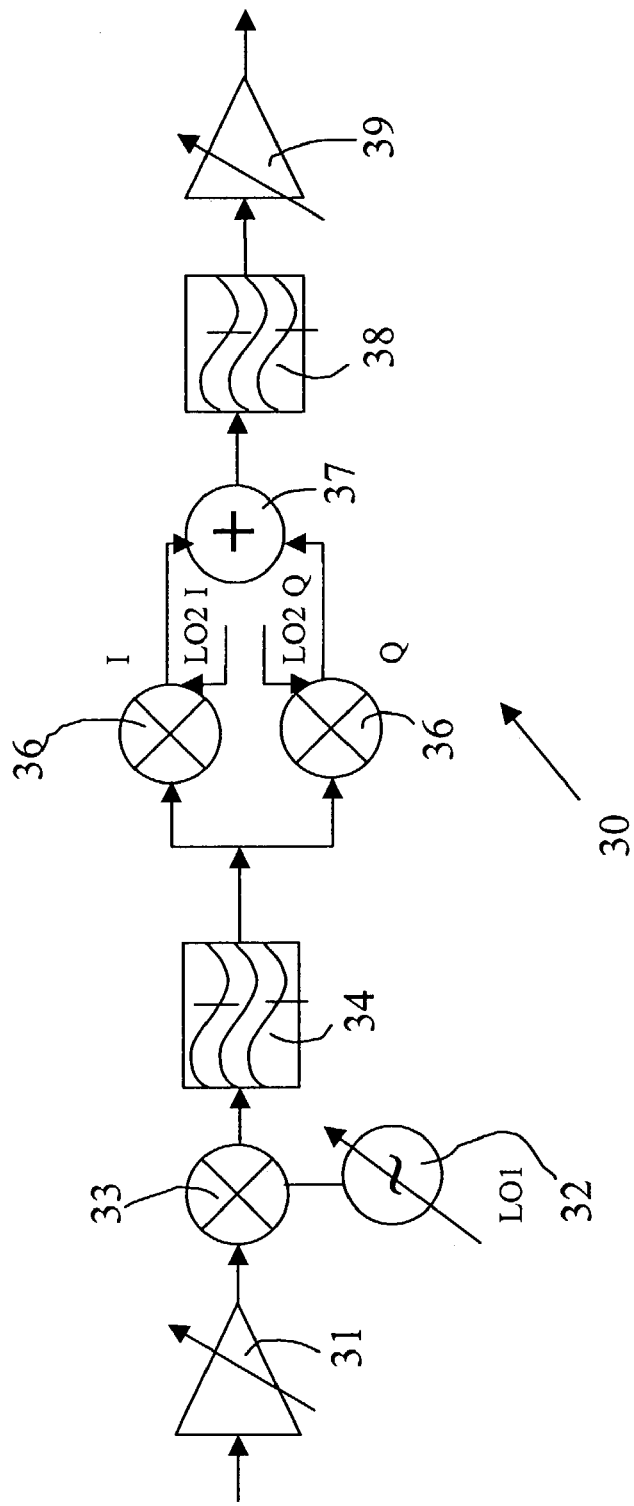
FIG. 2 is a block diagram of a prior art integrated cable tuner.
Figure 3:
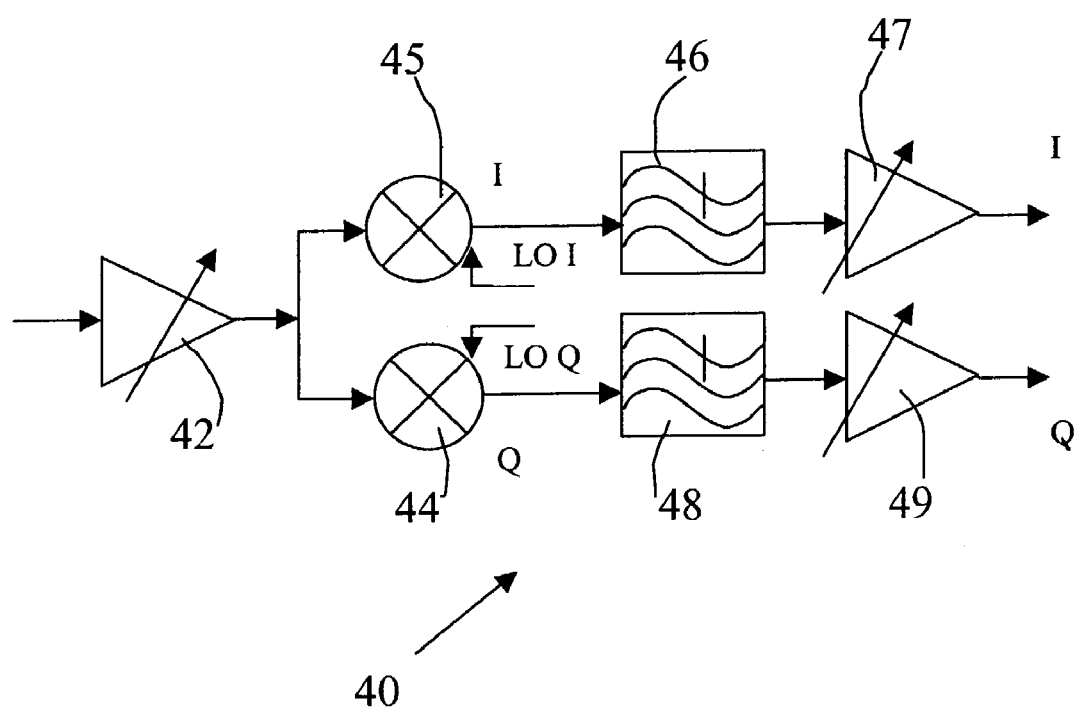
FIG. 3 is a block diagram of a prior art integrated DBS tuner.
Figure 4:
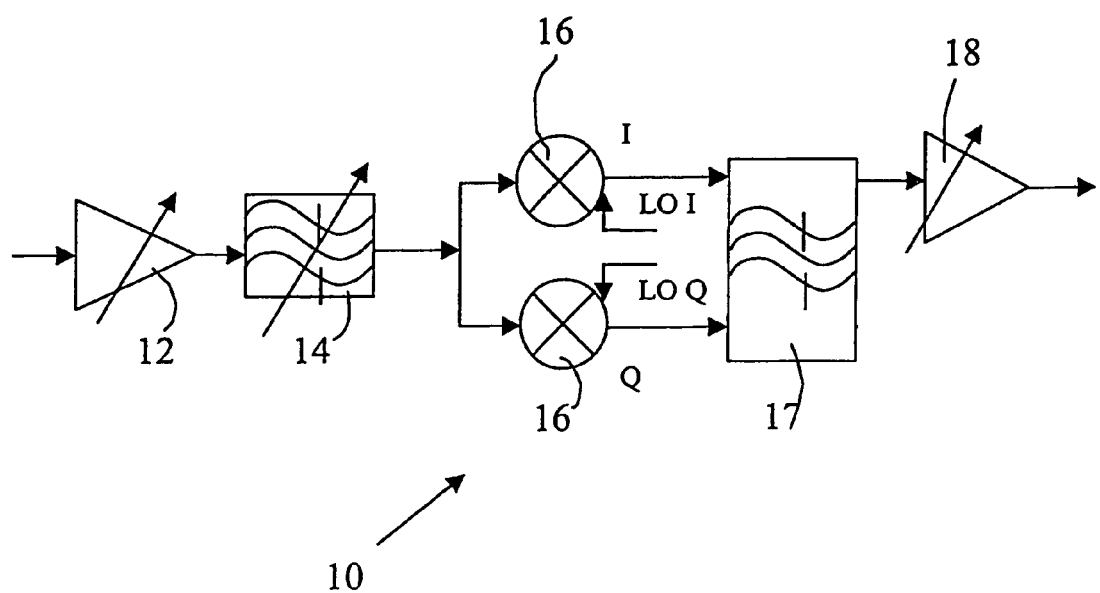
FIG. 4 is a block diagram of the present fully-integrated terrestrial TV tuner.

Referring to the FIG. 4, the present terrestrial tuner system is illustrated, and is generally identified by the numeral 10. The TV signal from the antenna enters the input of the low-noise amplifier (LNA) circuit 12, the output of which is connected to a tunable on-chip RF bandpass filter (RFBPF) circuit 14. The output of RFBPF circuit 14 is then connected to the two inputs of the complex mixer circuit 16, which consists of two identical mixers fed by identical input signals and two LO signals shifted by 90 degrees (LO I and LO Q). The complex mixer has two outputs I and Q. They enter two inputs of the complex IF bandpass filter (IFBPF) circuit 17. The I and Q outputs of the complex IFBPF circuit 17 are connected to the input of a variable gain amplifier (VGA) circuit 18.

LNA circuit 12 is required to have a low noise figure, very high linearity and ability of 25-30 dB gain control. RFBPF circuit 14 is realized as a tunable actively Q-enhanced passive LC filter demonstrating gain greater than 0 dB to help improve its noise figure and a good linearity. The complex mixer circuit 16 has a good linearity and a decent noise figure. It is followed by a complex active IFBPF circuit 17 and finally by VGA circuit 18 with gain control range of 50-55 dB and a good linearity.

Since the standard TV IF is at 44 MHz the image is positioned always 88 MHz away from the passband of RFBPF circuit 14. This allows the RFBPF circuit 14 to attenuate the signal at image frequency by at least 10 dB for both VHF and UHF bands.

If the low-IF instead of the standard TV IF is used the image attenuation by the RFBPF circuit 14 will be negligible. However, the two other elements: the complex mixer circuit 16 and the complex IFBPF circuit 17 will provide required 65 dB of image rejection.

Because of its simple single-conversion architecture and the inclusion of the prefiltering the presented TV tuner 10 demonstrates excellent linearity. It is able to process the input signals up to about 0 dBm in 75 Ohm environment. Its overall noise performance also exceeds that of specs: its noise figure is below 6 dB.

As an advantage over terrestrial hybrid designs the present tuner achieves a substantial cost reduction by elimination of the factory tuning, the metal shield can and the module filled with discrete components. Overall the estimated component and labor savings for the TV or VCR manufacturer should be in the range of approximately $2 per unit. The present tuner does not use any external components except for power supplies blocking caps and possibly the synthesizer loop filter.

As additional advantage over terrestrial hybrid and the existing integrated cable designs, since all filtering is performed on-chip and it is assisted with automatic tuning circuitry, no factory trim is required to meet the specs. This additionally simplifies the hardware manufacturing and reduces its overall unit cost by at least $2 through elimination of two ceramic or SAW filters and other discrete components needed for a typical integrated cable tuner.

Because of its simple single-conversion architecture including the prefiltering and since all filtering is performed on-chip the tuner power consumption is reduced to 300-500 mW for the standard home applications with possibility of only 100-200 mW for mobile applications. This is 3-10 times lower compared to present integrated cable turners.

With only minor specification modifications the presented tuner technology is applicable both for terrestrial analog applications and digital cable applications.

Because of its small feature size, low power consumption and its affordable pricing, the presented tuner lends itself to multiple tuner applications in contemporary home appliances and emerging portable and mobile applications.

For the cost purpose the targeted technology is a short-channel CMOS, but any modern silicon CMOS, BiCMOS, or bipolar technology process may be used to implemented the presented tuner.

I claim:

1. A tuner system for television signal reception comprising:
    a low-noise amplifier for receiving a television signal, said low-noise amplifier having a gain and generating an output signal;
    a tunable real band-pass filter, having a symmetrical frequency response for positive and negative frequencies, for directly receiving said output signal of said low-noise amplifier, and for generating an output signal;
    a complex mixer including of at least two mixers for receiving said output signal of said real band-pass filter and for generating at least one output signal;
    a continuous time complex analog band-pass filter, having a non-symmetrical frequency response for positive and negative frequencies, for directly receiving said at least one output signal of said mixer and generating for at least one output signal; and
    a variable gain amplifier for receiving said at least one output signal of said complex band-pass filter.

2. The tuner system of claim 1 wherein said variable gain amplifier includes:
    first and second variable-gain amplifiers for receiving first and second output signals from said complex band-pass filter.

3. The tuner system of claim 1 wherein said filters, amplifiers and mixer are fabricated in monolithic technology selected from the group consisting of silicon CMOS, BiCMOS and bipolar processes.

4. The tuner system of claim 1 wherein:
    said real band-pass filter is an on-chip active device; and
    said complex band-pass filter is an on-chip active device.

5. The tuner system of claim 1 and further including:
    an on-chip frequency-tuning system for the said real band-pass filter;
    an on-chip Q-tuning system for the said real band-pass filter;
    an on-chip frequency-tuning system for the said complex filter; and
    an on-chip Q-tuning system for the said complex filter.

6. The tuner system of claim 1 further including:
    a frequency-tuning system for at least one of said filters for adjusting a center-frequency with respect to a reference frequency; and
    a Q-tuning system for at least one of said filters for adjusting a magnitude, and thereby a filter Q-factor, with respect to a reference amplitude.

7. The tuner system of claim 1 wherein:
    said real band-pass filter is tunable by changing its center frequency and its bandwidth; and
    said complex band-pass filter is tunable by changing its center frequency and its bandwidth.

8. The tuner system of claim 1 wherein:
said real band-pass filter is selected from the group consisting of Q-enhanced LC design and gm-C design; and
a complex band-pass filter is selected from the group consisting of an active R-C design, MOSFET-C design, and gm-C design.

9. The tuner system of claim 1 and further including:
means for controlling said gain of said low-noise amplifier.

10. The tuner for the system of claim 1 where said mixer includes:
first and second mixers driven by local oscillator signals in quadrature.

11. The tuner system of claim 1 and further including a local oscillator operating at a higher frequency than the input TV carrier frequency, or at high-side injection.

12. The tuner system of claim 1 and further including a local oscillator operating at a lower frequency than the input TV carrier frequency, or at low-side injection.

13. The tuner system of claim 1 and further including a local oscillator operating at a frequency that down-converts the input TV carrier frequency to one of a standard IF TV frequency.

14. The tuner system of claim 1 and further including a local oscillator operating at a frequency that down-converts the input TV carrier frequency to a low-IF frequency that is distinctly lower than any standard TV IF frequency.

\* \* \* \* \*